United States Patent
Vilanova Fabrega et al.

(10) Patent No.: US 12,215,757 B2
(45) Date of Patent: Feb. 4, 2025

(54) MÖBIUS STRIP FORMING DEVICE, FORMING MACHINE USING THE FORMING DEVICE AND TEXTILE CHAIN FORMING PROCEDURE

(71) Applicants: David Vilanova Fabrega, Girona (ES); Eudaldo Murtra Lozoya, Barcelona (ES)

(72) Inventors: David Vilanova Fabrega, Girona (ES); Eudaldo Murtra Lozoya, Barcelona (ES)

( * ) Notice: Subject to any disclaimer, the term of this patent is extended or adjusted under 35 U.S.C. 154(b) by 280 days.

(21) Appl. No.: 17/800,748

(22) PCT Filed: Feb. 15, 2021

(86) PCT No.: PCT/EP2021/053601
§ 371 (c)(1),
(2) Date: Aug. 18, 2022

(87) PCT Pub. No.: WO2021/165186
PCT Pub. Date: Aug. 26, 2021

(65) Prior Publication Data
US 2023/0086670 A1  Mar. 23, 2023

(30) Foreign Application Priority Data
Feb. 21, 2020  (EP) ..................... 20382125

(51) Int. Cl.
*F16G 13/18*  (2006.01)
*D05B 23/00*  (2006.01)
(Continued)

(52) U.S. Cl.
CPC ............. *F16G 13/18* (2013.01); *D05B 23/00* (2013.01); *D05B 27/00* (2013.01); *D07B 5/005* (2013.01);
(Continued)

(58) Field of Classification Search
CPC .......... F16G 13/12; F16G 13/18; F16G 15/12; D05B 23/00; D05B 27/00; D07B 5/005;
(Continued)

(56) References Cited

U.S. PATENT DOCUMENTS 3,280,995 A * 10/1966 Barkley ............... B65G 47/248
                                                      198/405
5,212,884 A *  5/1993 Stockli ................... G11B 23/22
                                                       29/241
(Continued)

FOREIGN PATENT DOCUMENTS

CH          682552 A5    10/1993
JP          S5153999 U    4/1976
(Continued)

OTHER PUBLICATIONS

Dyneema®, 'How Synthetic Lifting Chains with Dyneema® are Made', https://www.youtube.com/watch?app=desktop&v=jV0HK2Wt7X0, Nov. 23, 2016 (Year: 2016).*

*Primary Examiner* — Jared O Brown
(74) *Attorney, Agent, or Firm* — Hayes Soloway PC (57) ABSTRACT

A forming device for forming links in the shape of a Möbius strip includes a rotation module with an inner path. The forming device has a widening for 180° rotation of a strip introduced into the rotation module. The rotation module has an inlet suitable for one end of a strip, an outlet suitable for the strip and the inner path extends from the inlet to the outlet. The widening is adapted for rotation of the end of the strip 180° about its longitudinal axis. The device also includes a gas injector positioned at the inlet of the rotation module intended to drive the strip through the inner path of the rotation module.

14 Claims, 11 Drawing Sheets

(51) Int. Cl.
*D05B 27/00* (2006.01)
*D07B 5/00* (2006.01)
*D07B 5/10* (2006.01)
*D07B 7/16* (2006.01)
*F16G 13/12* (2006.01)
*F16G 15/12* (2006.01)

(52) U.S. Cl.
CPC ............... *D07B 5/10* (2013.01); *D07B 7/167* (2013.01); *F16G 13/12* (2013.01); *F16G 15/12* (2013.01); *D07B 2201/1004* (2013.01)

(58) Field of Classification Search
CPC .......... D07B 5/10; D07B 7/165; D07B 7/167; D07B 2201/1004; D07B 2501/2015
USPC ...................................... 59/16, 18, 20, 25, 92
See application file for complete search history.

(56) References Cited

U.S. PATENT DOCUMENTS

D862,093 S  10/2019 Bosman
11,312,596 B2 * 4/2022 Bosman ................. F16G 15/12

FOREIGN PATENT DOCUMENTS

JP  H069962 U  2/1994
WO  9601186 A1  1/1996

* cited by examiner

MÖBIUS STRIP FORMING DEVICE, FORMING MACHINE USING THE FORMING DEVICE AND TEXTILE CHAIN FORMING PROCEDURE

CROSS-REFERENCE TO RELATED APPLICATIONS AND PRIORITY

This patent application claims priority from PCT Application No. PCT/EP2021/053601 filed Feb. 15, 2021, which claims priority from European Patent Application No. 20382125.1 filed Feb. 21, 2020. Each of these patent applications are herein incorporated by reference in their entirety.

OBJECT OF THE INVENTION

A first object of the present invention is a forming device for forming links in the shape of a Möbius strip. A second object of the invention is a textile chain forming machine wherein each of the links in the chain is a Möbius strip, for which reason it has excellent wear properties and withstands very high loads and which uses the forming device.

Finally, another object of the present invention is a procedure for forming said textile chain using the forming device.

BACKGROUND OF THE INVENTION

While goods are being transported, it is often necessary to secure and/or lift very heavy loads in order to move them from one point to another. To do so, lifting cranes are normally used, which are hooked to the loads by chains, usually made of metal.

This type of metal chain has a number of drawbacks, which make moving goods complicated and laborious. Specifically, metal chains are very heavy, which adds an additional load to the cranes.

Furthermore, they are very susceptible to wear and tear, since besides the strong impacts they may undergo during use, they are normally exposed to weather conditions, being able to rust or being altered in some other way, for which reason when this happens it can have serious consequences.

An alternative to metal chains are fibre tapes, made from very resistant materials, and that by comprising a set of fibres in one same tape, they can have much better features than those of metal chains, enabling the transport of heavier loads.

Furthermore, these fibre tapes are much lighter, making them easy to use and move. Finally, by comprising a set of fibres in one same tape, in the event that the tape wears out, the fibres break one by one, in a very visible manner. In this case, the tape can be replaced and thereby prevent unforeseen accidents.

Moreover, the Möbius strip or loop must be highlighted, which is a surface with a single face and a single edge. It has the mathematical property of being a non-orientable object.

It is also a ruled surface. This strip has been studied extensively over time since it has a series of very special features, and is applicable in many fields.

In order to form a Möbius strip, one must start with a strip of a certain material, one of the ends is turned halfway, i.e., a 180° rotation on itself, and finally both ends are joined.

The present invention, described below, uses the properties of the Möbius strip to build a textile chain that has exceptional properties against wear and load capacity.

DESCRIPTION OF THE INVENTION

The first object of the present invention is a Möbius strip forming device, configured to construct a link in the shape of a Möbius strip starting from a textile strip made of natural, synthetic or artificial fibres.

To do so, the forming device comprises a rotation module with an inlet through which the end of the strip is introduced, an outlet for the strip, and an inner path through which the strip circulates, which goes from the inlet to the outlet.

In the inner path, preferably at an end opposite from the inlet, it has a widening for rotating the strip. The strip is introduced through the inlet, circulates through the inner path until it reaches the widening wherein the end of the strip rotates 180° on itself, forming the characteristic curve of the Möbius strip. The strip then continues to advance through the inner path until it reaches the outlet of the rotation module, the end of the protruding strip being rotated 180° with respect to the position where it entered the rotation module.

Additionally, the Möbius strip forming device may comprise a gas injector positioned at the inlet of the rotation module. The gas injector helps the strip advance more easily through the inside of the rotation module.

Furthermore, the Möbius strip forming device may comprise detection means, intended to detect the strip when it begins to leave through the outlet of the rotation module, such that strip is no longer supplied to the device.

The second object of the invention is a textile chain forming machine, which first comprises a fixed structure, which acts as a support for the rest of the elements.

Attached to the fixed structure, the forming machine comprises a Möbius strip forming device, first object of the invention. Furthermore, it comprises a series of elements which are explained below and enable the forming of a chain wherein each of the links thereof is a Möbius strip.

Specifically, the textile chain forming machine comprises a strip supply assembly, preferably with a shuttle and a dispenser, both attached to the fixed structure, which are responsible for supplying the strip to the Möbius strip forming device.

The dispenser provides the strip that is necessary to make up each link, such that it is close to the inlet of the rotation module. Moreover, the shuttle facilitates the introduction of the strip through the inlet of the rotation module. The shuttle may also comprise an additional gas injector, which supplies an oriented gas stream, enabling the strip to enter inside the rotation module with ease.

Moreover, the textile chain forming machine comprises provisional joining means for the ends of the strip on the link, in order to prevent it from falling apart once it has left the forming device, and joining means, likewise attached to the fixed structure, intended to join the strip forming a link, once it leaves the rotation module.

The forming machine also comprises securing elements attached to the fixed structure and movable with respect to it, intended to hold the link while maintaining the shape thereof, once it has been extracted from the rotation module, while the link is closed with the joining means.

It likewise comprises a cutting mechanism attached to the fixed structure, intended to cut and separate the link from the rest of the strip.

With the aim of positioning the links that have already been formed and separated from the rest of the strip and being able to link them with the strip that is going to be introduced into the Möbius strip forming device, such that they form the chain, the textile chain forming machine comprises securing elements also attached to the fixed structure.

Finally, the textile chain forming machine comprises a pre-tensioning assembly, intended to apply a tensile force to the links such that the fibres of the strip making up each link are reordered, compacted and aligned, improving the properties of the chain.

Finally, the third object of the present invention is a textile chain forming procedure using the described textile chain forming machine.

In a first step of the procedure, the strip is supplied to the rotation module of the forming device, the end of the strip being rotated 180°, forming a first link in the shape of a Möbius strip.

Then, the arrival of the strip at the outlet of the rotation module is detected by detection means. At that time, the strip supply ends.

In a second step, the end of the strip is joined to the rest of the strip, to prevent the first link from falling apart.

In the third step, the rest of the strip is pulled, by pulling means, on the first link, incorporating additional loops of strip on said first link, such that a structure is obtained which is more resistant and has better properties.

The first formed link is extracted from the forming device, and the link remains secured with the securing elements, at which point, in a fourth step of the procedure, the link is separated from the rest of the strip with the cutting mechanism.

At the end of all these steps, the first link in the chain would be made. Then, the ends of the strip are joined on the link and the first link is positioned such that the new strip to be introduced into the forming device can be linked, thereby making up the chain.

These steps can be repeated until a chain of the desired length is formed.

Subsequently, the procedure may additionally comprise a step of pre-tensioning the chain in the pre-tensioning assembly, managing to reorient the fibres making up the strip, thereby obtaining better properties for the chain.

Finally, the final joining of the ends of the strip is carried out on the very link and a final tensioning step is carried out at a temperature between 10° C. and 150° C. depending on the physical properties of the chain that is to be obtained.

DESCRIPTION OF THE DRAWINGS

As a complement to the description provided herein, and for the purpose of helping to make the features of the invention more readily understandable, in accordance with a preferred practical exemplary embodiment thereof, said description is accompanied by a set of drawings constituting an integral part of the same, which by way of illustration and not limitation, represent the following.

PREFERRED EMBODIMENT OF THE INVENTION

A preferred embodiment of the present invention is described below with the help of FIGS. 1A to 11.

Figure 10A:
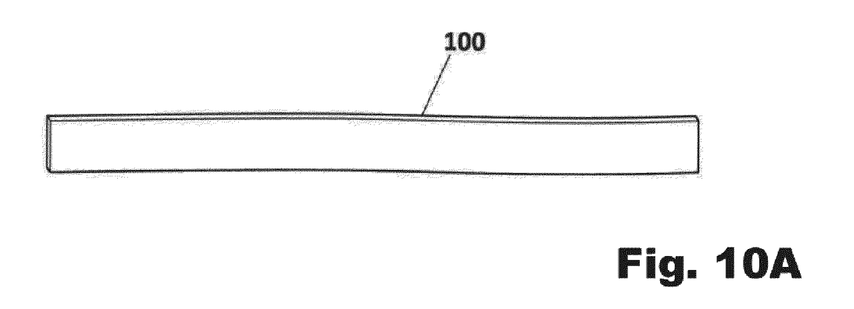
FIG. 10A shows a general view of the strip.

FIG. 10A shows a strip (100) which is the one that will be used, both in the Möbius strip forming device (20), first object of the present invention, and in the textile chain forming machine, second object of the present invention, in order to form a textile chain (200) of natural, synthetic or artificial fibres.

This chain (200) has the particularity that each of the links (300) thereof is a Möbius strip, which gives the chain (200) exceptional properties of resistance and load capacity.

Figure 8A:
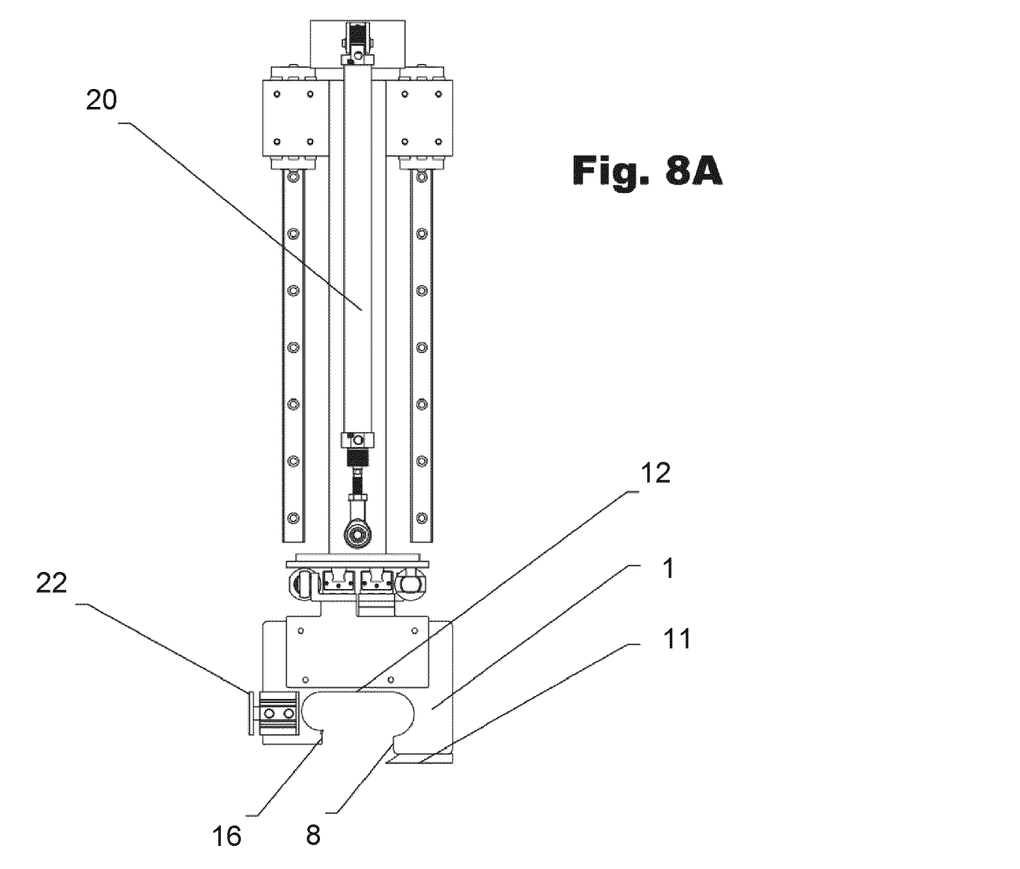
FIG. 8A shows a top view of the forming device with the rotation module closed.
Figure 8B:
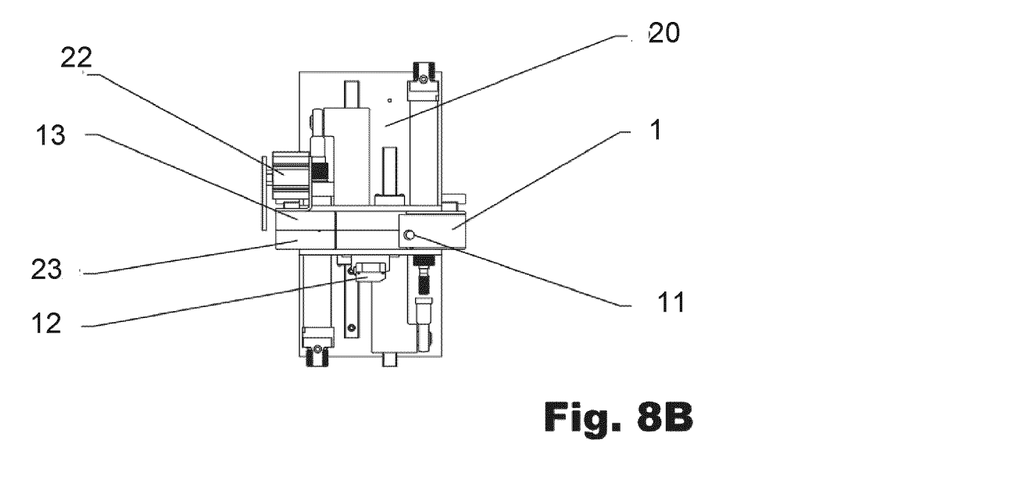
FIG. 8B shows a front view of the forming device with the rotation module closed.
Figure 9:
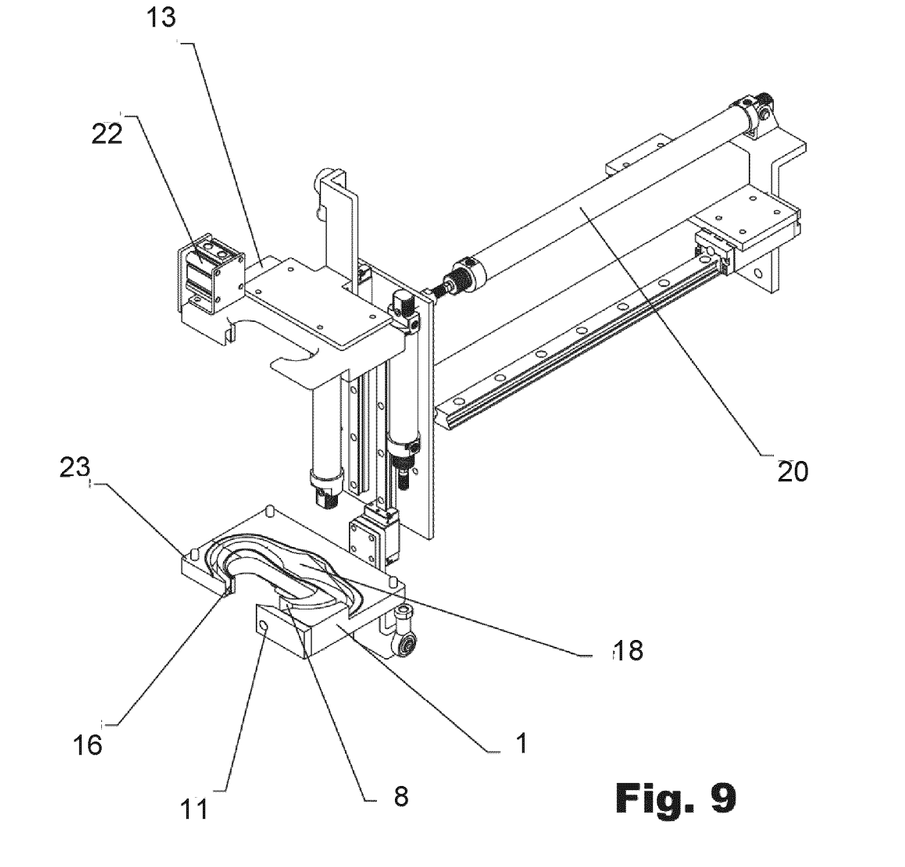
FIG. 9 shows a general view of the forming device with the rotation module open.

The first object of the present invention, the Möbius strip forming device (20), is represented in FIGS. 8A, 8B and 9. Specifically, the forming device (20) comprises a rotation module (1) with an upper half (13) and a lower half (23). FIG. 9 shows both halves (13, 23) of the rotation module (1) separated, while FIG. 8B shows both halves (13, 23) closed. When both halves (13, 23) are closed, the rotation module (1) is formed.

The rotation module (1) further comprises an inlet (8) for the strip (100) and an outlet (16) for the strip (100). Inside the rotation module (1) there is an inner path, which can be seen in detail in FIG. 9 and which goes from the inlet (8) to the outlet (16). The inner path, at the end opposite from the inlet (8), comprises a widening (18) for rotating the strip (100). In this manner, when the upper half (13) and the lower half (23) of the rotation module (1) are closed, the strip (100) is introduced through the inlet (8). In a preferred embodiment of the invention, the inner path and the widening (18) for rotation have the shape of the negative of the Möbius strip.

The strip (100) circulates through the inner path until it reaches the widening (18) wherein the end of the strip (100) rotates 180° on itself, forming the characteristic curve of the Möbius strip. The strip (100) continues to advance through the inner path until it reaches the outlet (16) of the rotation module (1), the end of the protruding strip (100) being rotated 180° with respect to the position where it entered the rotation module (100).

The Möbius strip forming device (20) further comprises, as shown in FIGS. 8A and 8B, a gas injector (11), positioned at the inlet (8) of the rotation module (1). By expelling gas, the gas injector (11) helps the strip (100) advance more easily through the inside of the rotation module (1).

Furthermore, the Möbius strip forming device (20) comprises detection means (12), intended to detect the strip (100) when it leaves through the outlet (16) of the rotation module (1). The detection means (12) are seen in FIG. 8B.

Figure 1A:
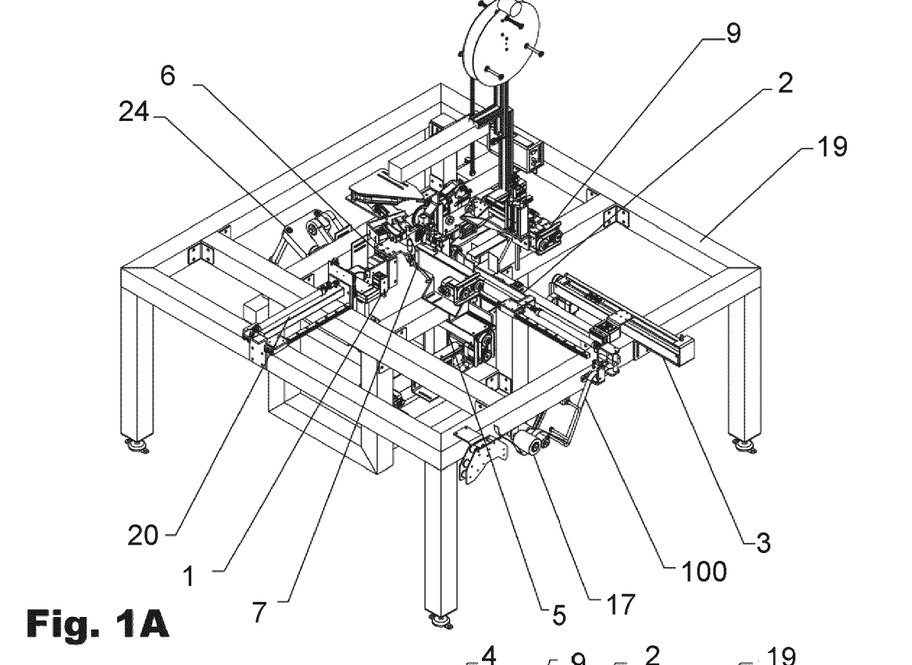
FIG. 1A shows a general view of the textile chain forming machine.
Figure 1B:
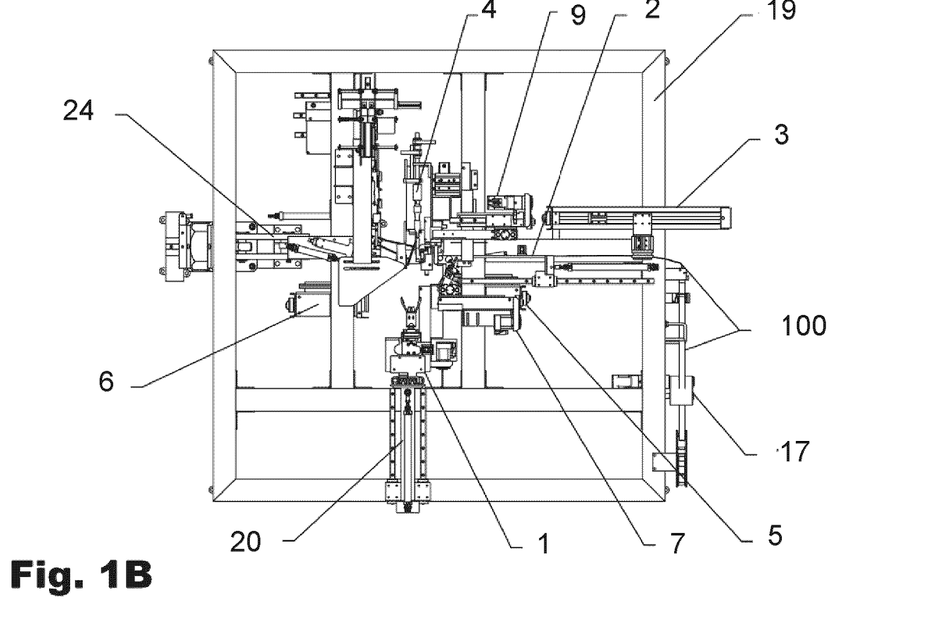
FIG. 1B shows a plan view of the textile chain forming machine.

The second object of the invention is a textile chain forming machine, which is represented in a general view in FIG. 1A and a plan view in FIG. 1B. The textile chain forming machine first comprises a fixed structure (19), which acts as a support for the rest of the elements.

Figure 10B:
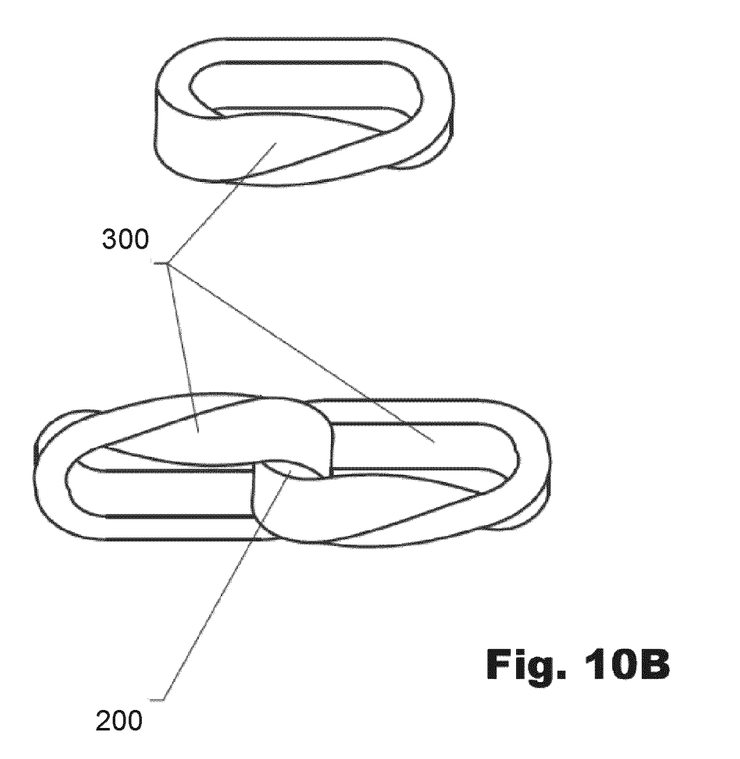
FIG. 10B shows a general view of one link of the chain in the shape of a Möbius strip, and a chain with a pair of links.

Attached to the fixed structure (19), the forming machine comprises a Möbius strip forming device (20), first object of the invention and represented in detail in FIGS. 8A, 8B and 9. Furthermore, it comprises a series of elements which are explained below and which enable a chain (200) to be formed wherein each of the links (300) thereof is a Möbius strip obtained from the forming device (20) described, as shown in FIG. 10B.

Specifically, the textile chain forming machine comprises a strip supply assembly, with a shuttle (2) and a dispenser (3), both attached to the fixed structure (19) and shown in FIGS. 1A and 1B, which are responsible for supplying the strip (100) to the Möbius strip forming device (20).

The dispenser (3), connected to supply rollers (17), which are shown in FIG. 1A, provides the strip (100) that is necessary to make up each link (300), such that it is always close to the inlet (8) of the rotation module (1). Moreover, the shuttle (2) facilitates the introduction of the strip (100) through the inlet (8) of the rotation module (1).

The shuttle (2) also comprises an additional gas injector, which supplies an oriented gas stream, enabling the strip (100) to enter the inside the rotation module (1) with ease.

Figure 4:
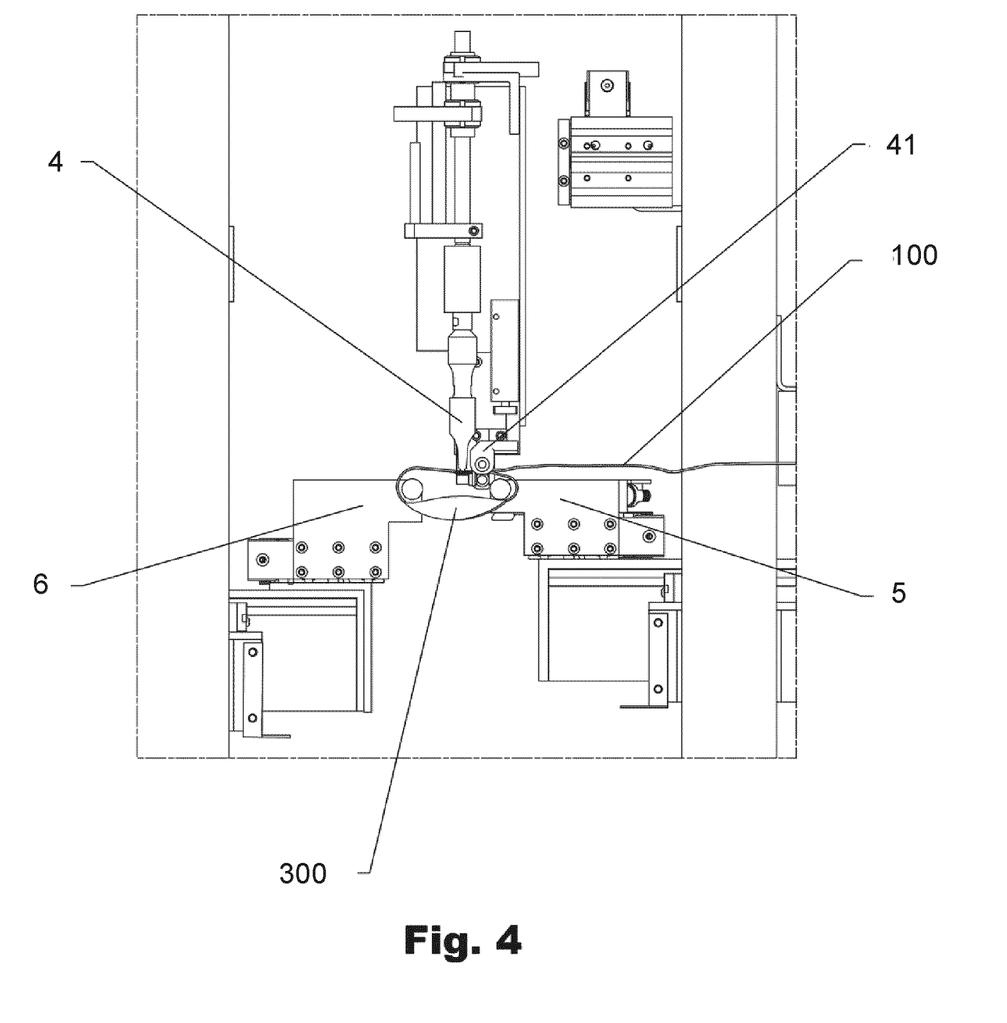
FIG. 4 shows a detail view of the movements of the securing elements of the link once it has left the forming device.

Moreover, the textile chain forming machine comprises joining means (4), which are shown, for example, in FIG. 4, likewise attached to the fixed structure (19), intended to join the strip (100) forming a link (300). The joining means (4) consist of a stapler (41), shown in FIG. 4, intended to hold the end of the strip (100) once it has adopted the Möbius shape in order to facilitate the joining.

Figure 5:
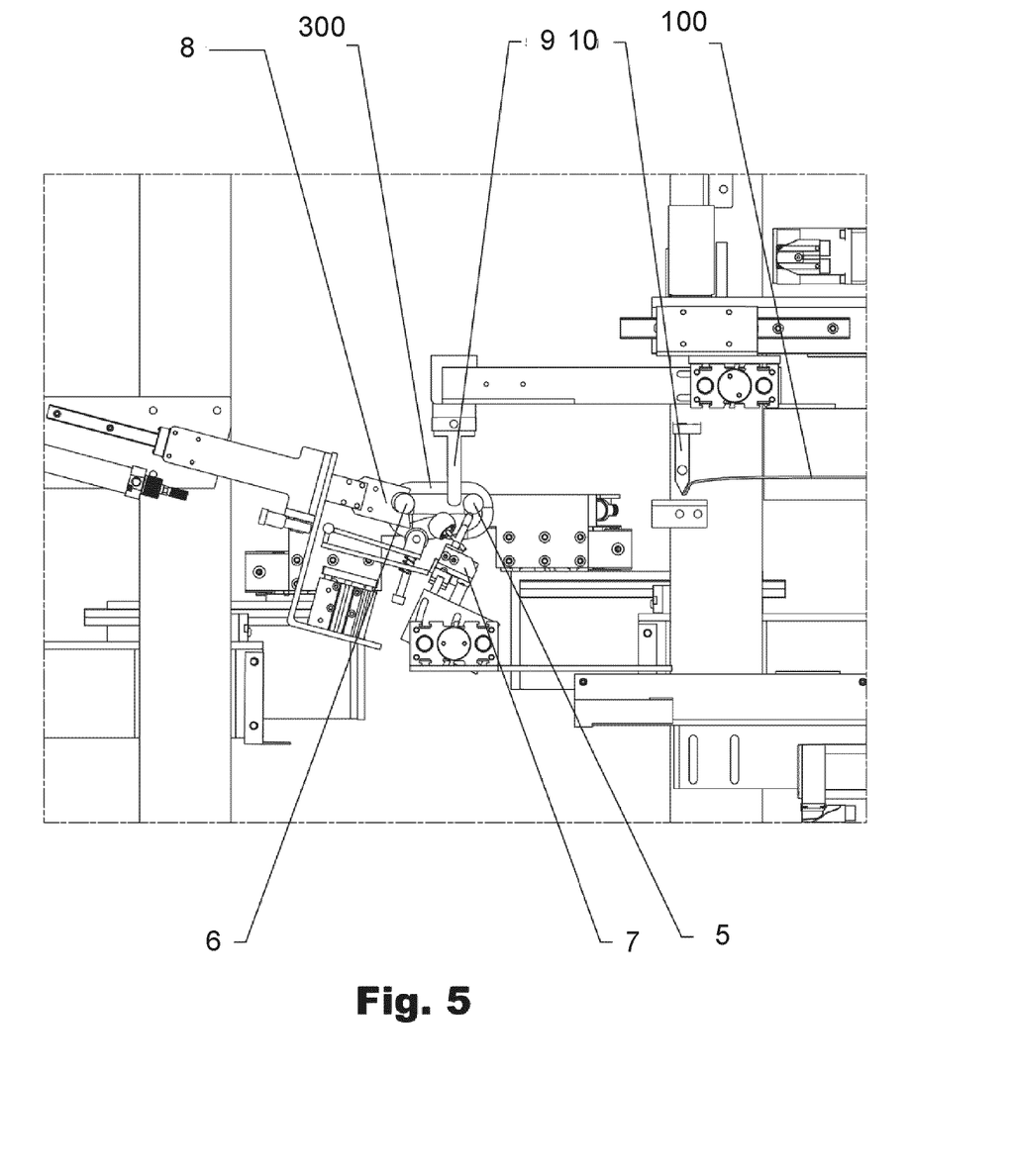
FIG. 5 shows a detail view of the joining means moving closer to join the link, as well as the cutting mechanism separating the link from the rest of the strip.

The forming machine also comprises securing elements (5, 6, 7) attached to the fixed structure (19) and movable with respect to it, which are shown in detail in FIG. 4 or 5. Specifically, a first pivot (5), a second pivot (6), represented in FIG. 4, and a finger with a roller (7), represented for example in FIG. 5, intended to hold the link (300) maintaining the shape thereof, once it has been extracted from the rotation module (1), while the link (300) is closed with the joining means (4).

The forming machine likewise comprises a cutting mechanism (10) attached to the fixed structure (19), intended to cut and separate the link (300) from the rest of the strip (100). The cutting mechanism (10) is shown in FIG. 5.

In order to position the links (300) that have already been formed and cut and to link them with the strip (100) which is going to be introduced into the Möbius strip forming device (20), such that they form the chain (200) shown in FIG. 10B, the textile chain forming machine comprises securing elements (9, 14 and 15) also attached to the fixed structure (19). Specifically, these securing elements are pulling means (9), shown in FIG. 5, a lower securing element (14), shown in FIG. 6, and a chain securing element (15), also shown in FIG. 6.

Figure 7:
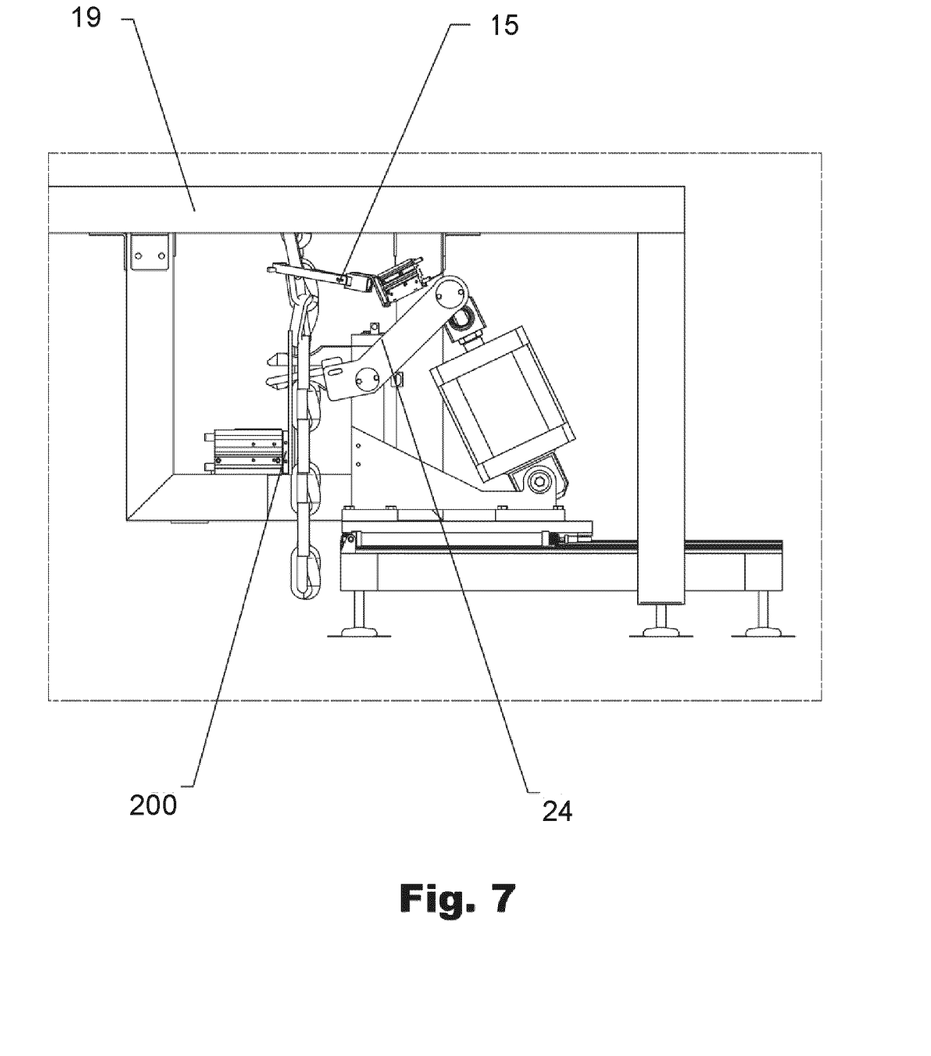
FIG. 7 shows a side view of the pre-tensioning assembly.

Finally, the textile chain forming machine comprises a pre-tensioning assembly (24) as shown in FIG. 7, intended to apply a tensile force to at least one link (300), or if the chain (200) comprises several links (300), to apply a tensile force on the formed links (300), such that the fibres of the strip (100) making up the chain (200) are reordered, improving the properties thereof.

The third object of the present invention is a textile chain forming procedure, wherein the chain (200) comprises a series of links (300) and wherein each link (300) is built from a textile strip (100) and has the shape of a Möbius strip. The procedure uses the textile chain forming machine described above and comprises the steps described below:

The first step consists of supplying strip (100) to the rotation module (1) of the forming device (20). To do so, the forming device (20) enters a central position, as shown in FIG. 2.

The shuttle (2) is then activated. Specifically, a brake (21) of the shuttle is activated, which secures the strip (100) to be supplied, as seen in FIG. 2. The shuttle (2) then advances to the inlet (8) of the rotation module (1), as indicated in the right portion of FIG. 2, pulling the strip (100).

Then, the dispenser (3) comprising a securing element is closed. In this step, the end of the strip (100) is rotated 180°, forming a first loop of the first link (300) with the characteristic shape of the Möbius strip.

Figure 2:
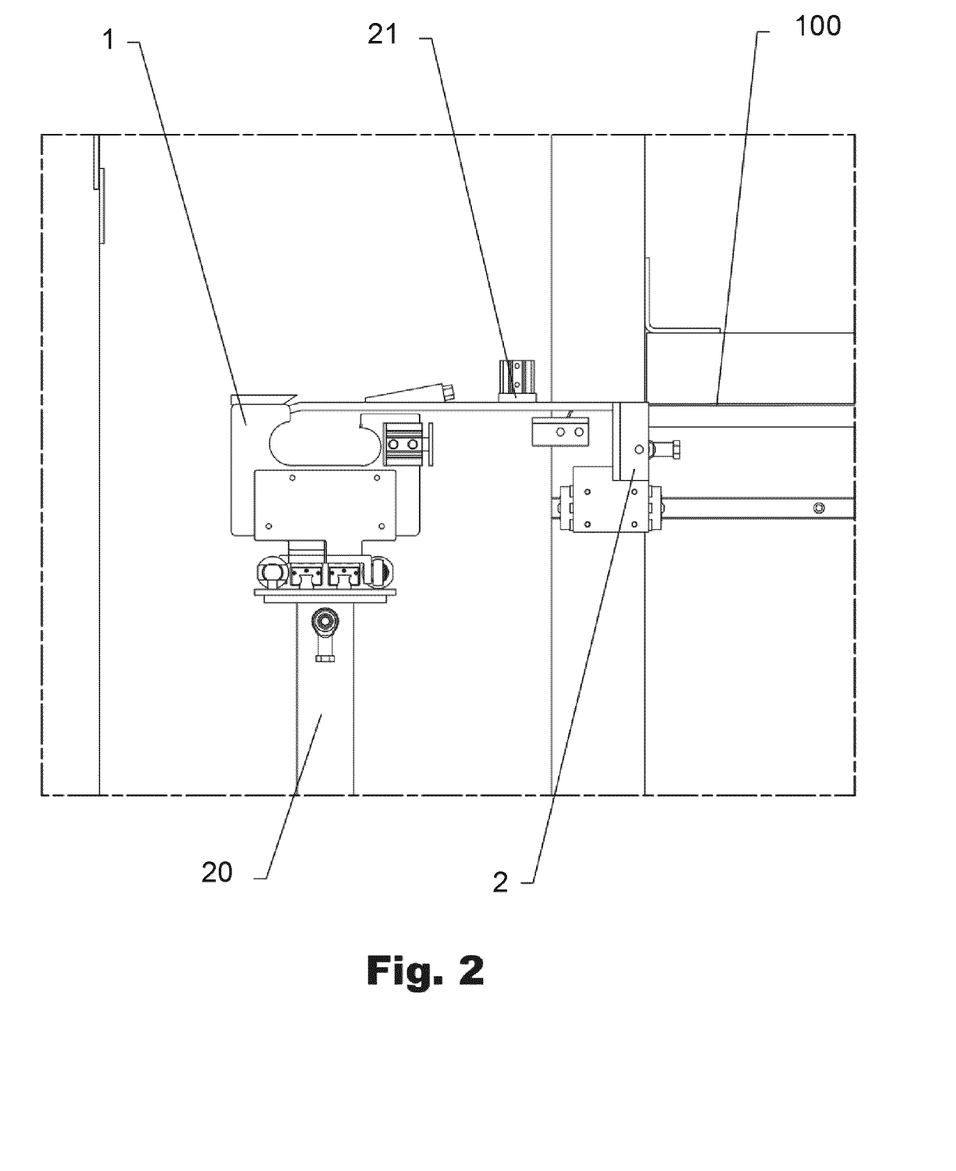
FIG. 2 shows the movement of the forming device and of the shuttle while the strip is being supplied to the rotation module.

To facilitate the inlet of the strip (100), an additional gas injector of the shuttle (2) and the gas injector (11) of the forming device (20) are activated, represented in FIG. 2. Both gas injectors expel a stream of gas which facilitates the inlet of the strip (100) through the inlet (8) of the rotation module (1). Furthermore, at the same time the dispenser (3) advances in order to supply a certain amount of strip inside the rotation module (1).

By means of the detection means (12) of the forming device (20), indicated in FIG. 8B, the strip (100) is detected at the outlet of the rotation module (1). This indicates that the strip (100) has flowed correctly inside the rotation module (1) and gas can stop being supplied.

In a second step, the end of the strip (100) is joined to the rest of the strip (100), in order to prevent the first loop of the link (300) from falling apart, by means of the joining means (4).

In a third step, the rest of the strip (100) is pulled on the first link (300), incorporating additional loops of strip (100), between 2 and 10, on the first link (300). This gives each link a much greater resistance.

Figure 3:
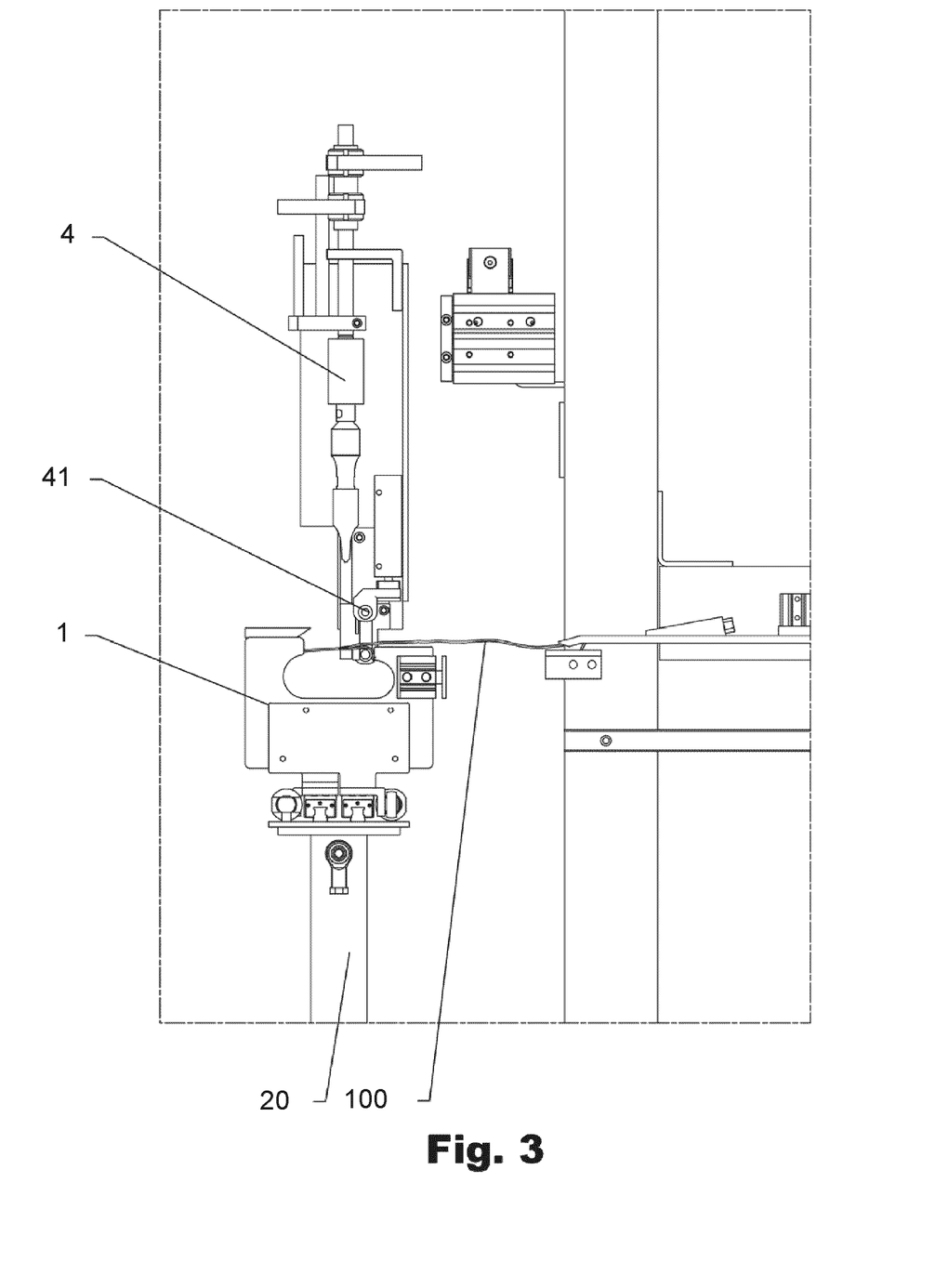
FIG. 3 shows a detail view of the positioning of the joining means and of the securing stapler intended to maintain the first link with all the loops controlled.

FIG. 4 shows a general view wherein the joining means (4) are moved to a position close to the forming device (20) and a stapler (41) of the joining means (4) is activated, intended to maintain the first link (300) with all the loops controlled, as indicated in FIG. 3.

Next, and once the strip (100) that already has the shape of a Möbius strip is tightly secured, the rotation module (1) opens, separating the upper half (13) and the lower half (23) of the rotation module (1), releasing the strip (100).

Afterwards, as indicated in FIG. 4, the securing elements are introduced, specifically a first pivot (5) and a second pivot (6) to a certain position, moving until they are inside the first link (300).

FIG. 5 shows a general view of the textile chain forming machine when another of the securing elements moves, in this case a finger with a roller (7) to a certain position, maintaining the shape of the link (300).

Afterwards, the excess strip (100) is collected in the dispenser (3). In this manner, it is ensured that the first link (300) of the chain (200) has the correct length, comprised between 60 mm and 600 mm.

In the fourth step of the procedure, the cutting mechanism (10) of the strip is activated, as shown in FIG. 5, separating the link (300) from the rest of the strip (100).

In the fifth step, the provisional joining of the ends of the strip forming the link (300) is performed on the link (300), so that it does not fall apart.

Figure 6:
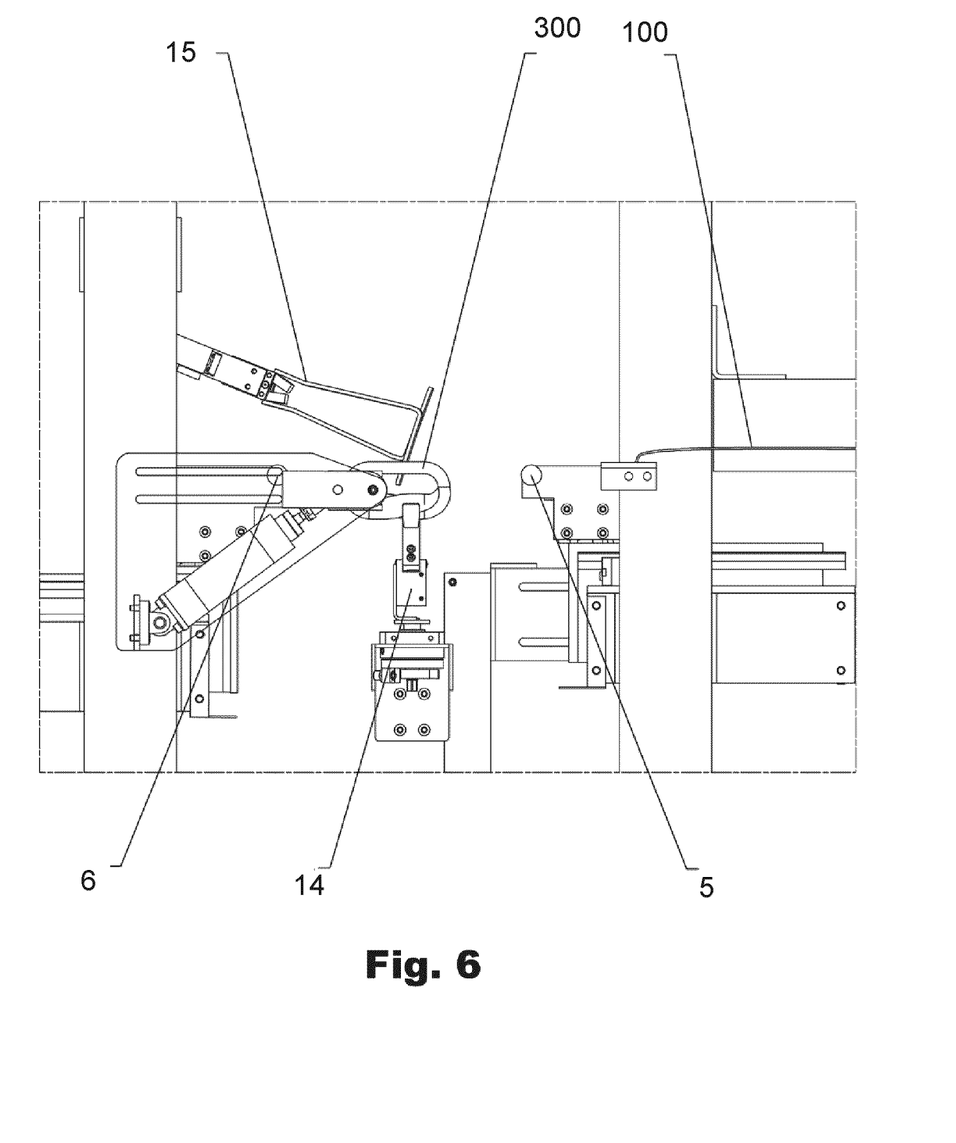
FIG. 6 shows a detail view of the securing elements while they hold the first link.

FIG. 6 shows the forming machine while the pivots (5 and 6) which release the tension of the link (300) move closer, and they are withdrawn to the resting position thereof.

In the sixth step, the previous steps are repeated forming a new link (300) linked with the first link (300), forming the chain (200). To do so, the lower securing element (14) which secures the link (300) rotates 90°, in order to be able to link it to the next link (300).

Then, the chain securing element (15) and the lower securing element (14) place the links (300) in a position indicated for performing the pre-tensioning by means of the pre-tensioning assembly (24), shown in FIG. 7, which is carried out with a load between 5% and 40% of the breaking load of the strip (100).

After the pre-tensioning, the definitive joining of the ends of the strip is performed on the very link (300), and a final tensioning of the chain is performed. The final tensioning is carried out with a load between 25% and 80% of the breaking load of the strip (100) and at a temperature comprised between 10° C. and 150° C.

The pre-tensioning and tensioning of the chain (200) enable the fibres making up the strip (100) of the chain to be compacted and aligned, and the fact that performing the final tensioning at a certain temperature enables the physical properties required for the chain (200) to be obtained.

Figure 11:
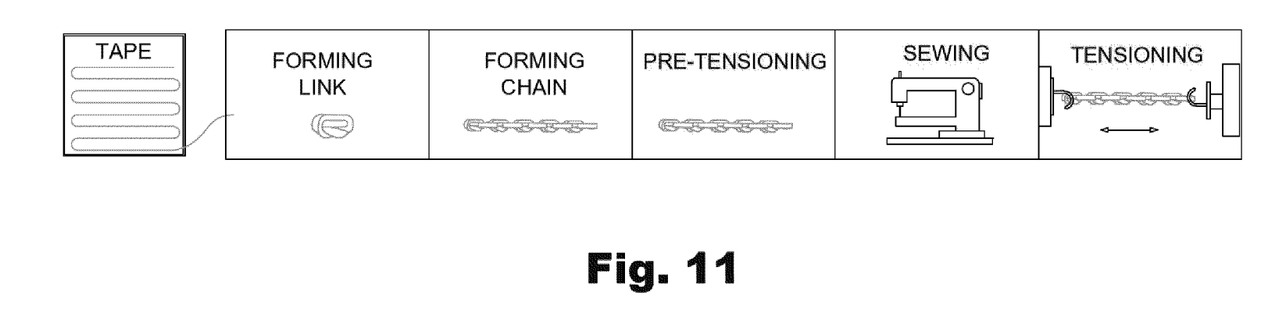
FIG. 11 shows a general diagram of the fundamental steps of the procedure object of the invention.

FIG. 11 shows, schematically and by way of summary, the fundamental steps of the procedure object of the invention, i.e., forming a link in the shape of a Möbius strip starting with a textile strip, pre-tensioning, forming the textile chain, sewing the links and final tensioning.

The invention claimed is:

1. A Möbius strip forming device, which comprises a rotation module with an inlet for a first end of a strip, an outlet for discharging the strip and an inner path from the inlet to the outlet, and the inner path comprising a widened portion adapted for rotation of the end of the strip 180° about a longitudinal axis of the strip, and wherein the device additionally comprises a gas injector positioned at the inlet of the rotation module to help the strip advance through the inner path of the rotation module.

2. The device of claim 1, further comprising a detector attached to the rotation module and intended to detect the end of the strip at the outlet of the rotation module.

3. A textile chain forming machine, intended to form a chain with links in the shape of a Möbius strip, the forming machine comprising:
a fixed structure,
the Möbius strip forming device of claim 1,
wherein the forming device is attached to the fixed structure,
a supply assembly for supplying strip to the rotation module of the forming device,
joining means attached to the fixed structure movable with respect to the fixed structure, and intended to join the end of the strip which exists the forming device with the rest of the strip, thereby forming a link, and
a cutter attached to the fixed structure, intended to cut and separate the link from the rest of the strip.

4. The forming machine of claim 3, further comprising a pre-tensioning a assembly, intended to apply a tensile force to links of a formed chain.

5. A textile chain forming procedure using the forming device of claim 1, comprising steps of:
supplying the strip to the rotation module of the forming device rotating the first end of the strip 180°, forming a first link in the shape of a Mobius strip,
joining the first end of the strip to the strip,
cutting the strip,
temporary joining of the first end and a second end of the strip on the link, and
forming a new link by repeating the previous steps and linking with the first link, thereby forming a chain.

6. The procedure of claim 5, further comprising a step, subsequent to the step of temporary joining the first end of the strip to the strip, of pulling the rest of the strip on the first link and incorporating at least one additional link of the strip on the first link.

7. The procedure of claim 5, wherein while the strip is being supplied to the rotation module, injecting a gas to help advance the strip.

8. The procedure of claim 5, further comprising setting a length of the link at 60 mm to 600 mm.

9. The procedure of claim 5, wherein a step of permanently joining the first end of the strip to the link is performed by sewing.

10. The procedure of claim 5, further comprising steps of pre-tensioning the chain and final joining of the first and second ends of the strip on the first link and the new link.

11. The procedure of claim 10, further comprising a step of final tensioning of the chain.

12. The procedure of claim 11, wherein the step of final tensioning of the chain is performed at a temperature between 10° C. and 150° C.

13. The procedure of claim 10, wherein the step of pre-tensioning the chain is performed with a load of up to 40% of a breaking load of the strip.

14. The procedure of claim 11, wherein the step of final tensioning of the chain is performed with a load of between 25% and 80% of a breaking load of the strip.

* * * * *